(12) United States Patent
Knoppke

(10) Patent No.: US 11,273,449 B2
(45) Date of Patent: Mar. 15, 2022

(54) STORAGE BOX FOR PIPETTE TIPS

(71) Applicant: TECAN TRADING AG, Mannedorf (CH)

(72) Inventor: Marina Knoppke, Wetzikon (CH)

(73) Assignee: TECAN TRADING AG, Mannedorf (CH)

( * ) Notice: Subject to any disclaimer, the term of this patent is extended or adjusted under 35 U.S.C. 154(b) by 463 days.

(21) Appl. No.: 16/393,737

(22) Filed: Apr. 24, 2019

(65) Prior Publication Data

US 2019/0336979 A1   Nov. 7, 2019

(30) Foreign Application Priority Data

May 3, 2018   (EP) .................................. 18170596

(51) Int. Cl.
*B01L 9/00*   (2006.01)
(52) U.S. Cl.
CPC ........... *B01L 9/543* (2013.01); *B01L 2200/08* (2013.01)
(58) Field of Classification Search
None
See application file for complete search history.

(56) References Cited

U.S. PATENT DOCUMENTS

| | | | |
|---|---|---|---|
| 2003/0152494 A1* | 8/2003 | Moritz ................... | B01L 9/543 422/561 |
| 2010/0221151 A1* | 9/2010 | Motadel .................. | B01L 9/543 422/526 |
| 2011/0236278 A1* | 9/2011 | Motadel .................. | B01L 9/543 422/560 |
| 2016/0167041 A1 | 6/2016 | Curry et al. | |

FOREIGN PATENT DOCUMENTS

| | | |
|---|---|---|
| EP | 1414574 B1 | 5/2007 |
| EP | 2389247 B1 | 3/2017 |

* cited by examiner

*Primary Examiner* — Brian R Gordon
(74) *Attorney, Agent, or Firm* — Notaro, Michalos & Zaccaria P.C.

(57) ABSTRACT

A storage box for plastic pipette tips that has a frame part with two longitudinal walls and two transverse walls that enclose an interior space laterally. The storage box has a support plate arranged on the upper side of the frame part with a large number of bearing openings that plastic pipette tips can be inserted. The storage box also includes a pipette tip contact piece on the underside of the frame part for contacting a plastic pipette tip inserted into one of the bearing openings.

23 Claims, 6 Drawing Sheets

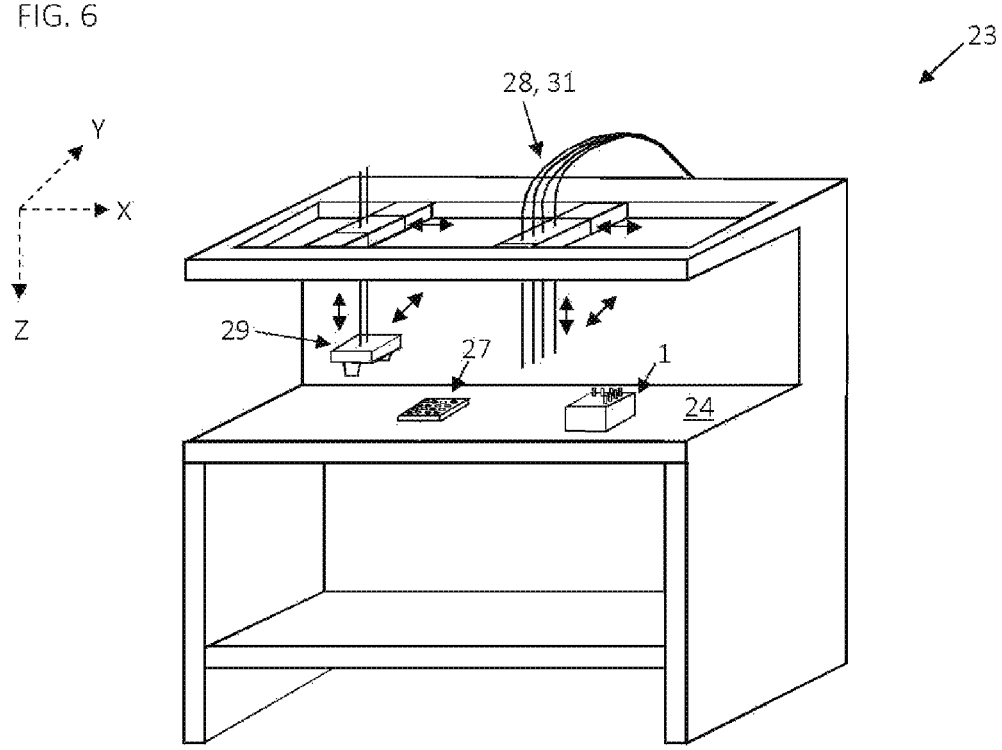

STORAGE BOX FOR PIPETTE TIPS

The present application claims priority of the European patent application number 18170596.3, filed on May 3, 2018.

TECHNICAL FIELD OF THE INVENTION

The present invention relates to a storage box for plastic pipette tips. The storage box comprises a frame part, which is formed from two longitudinal sides and two transverse sides, and an upper support plate. The upper support plate has a variety of bearing openings into which pipette tips can be inserted. In addition, a method for dissipating electrostatic charges from plastic pipette tips and the use of the above storage box in an automated liquid handling platform are proposed.

BACKGROUND OF THE INVENTION

Storage boxes for storing plastic pipette tips are well known from the prior art. Such boxes are used in particular when carrying out biochemical or other processes in order to provide plastic pipette tips to the user in an orderly manner. Such plastic pipette tips are typically used as disposable pipette tips; as they are disposed of after a single use (e.g. after pipetting a specific liquid). In this way, it can be avoided that unintentional liquid residues from previous pipetting steps are carried along in samples due to multiple use. In particular, when samples are processed in so-called microplates with a high density of sample vessels—the so-called wells—the sample volume to be investigated is rather small (it is in the range of microliters (µL)), so that contaminating liquid drops can have a strong effect on the reactions carried out with the sample.

The use of these microplates is particularly advantageous if a large number of samples are to be systematically examined. Today, microplates are mainly sold in a standardized format (e.g. the ANSI_SLAS_1-4 2004 standard; American National Standards Institute, 2006). Depending on the plate type, a different number of samples can be treated in a microplate, wherein the wells are each arranged in a special array and with a specific axial distance to each other. For example, 8×12 wells with a center distance of 9 mm are arranged on 96-well microplates, or 16×24 wells with a center distance of 4.5 mm are arranged on 384-well microplates. The basic area of the microplate, the so-called footprint, is the same for all plate types, so that different plate types can be used in the same device.

The use of automated liquid handling platforms is also well known, with which liquids can be pipetted automatically between different vessels and/or samples with high precision and high throughput rates. Exemplary mentioned are platforms of the Freedom EVO series of the current applicant. Such platforms usually have a pipetting head on which a large number of automatically operated pipettes can be arranged. These are also referred to as multichannel pipetting heads for the differentiation of so-called single-channel pipetting heads. Known are, for example, 8-fold pipetting heads with 8 pipettes, or 96-fold pipetting heads with 96 pipettes. The pipettes are usually arranged at a distance from each other equal to the wells axis distance of a standard microplate.

A pipetting needle (usually made of metal for multiple use) or a plastic pipette tip (for disposable use) can be placed sealingly on each pipette (both for single-channel and multi-channel devices), wherein various mechanisms can be applied. For example, there are plastic pipette tips for which the pipetting head is lowered so far that the pipettes of this pipetting head are inserted from above into an opening of the pipette tips until the pipette tips are held frictionally at the end of the respective pipette. Alternatively, the pipetting head can have its own receptacle openings, into which pipette tips are sealingly inserted with their upper end. Such receiving openings can be provided by a perforated plate integrated into the pipetting head.

The pipette tips are placed in this case in a storage box mentioned at the beginning, wherein they are also arranged in a standardized array and with the receiving opening facing upwards. Particularly when using such pipetting heads, it is advantageous if the pipette tips to be used are also offered to the pipetting head in a standardized form.

To discard plastic pipette tips after use, an ejection mechanism is used to push the pipette tips away from the end of the pipette. The plastic pipette tips can be dropped into a waste container or re-inserted into the bearing openings of the storage box. Analogously, plastic pipette tips can be placed on hand pipettes and ejected.

Such disposable pipette tips are typically made of polypropylene. In this way, the pipette tips can be produced cost-effectively and, if necessary, simply sterilized. Polypropylene is also characterized by good chemical resistance. However, it has been shown that such plastic pipette tips are electrostatically charged by the friction they generate, for example when they are placed on a pipette or ejected by the ejection mechanism. Similarly, even removing a packaging film from the storage box can lead to electrostatic charging of the pipette tips, as the storage boxes are often also made of polypropylene. Electrostatic charges can then be transferred from the storage box to the pipette tips.

However, such electrostatically charged plastic pipette tips can have a detrimental effect on the automation process, as they tend, for example, to stick to the pipettes of the pipetting head during ejection and can therefore no longer be placed back in the storage box. Such adhering pipette tips can then block the pick-up of a next pipette tip, or they fall off uncontrolled on the working field, so that in turn contamination can spread or operations are blocked on the corresponding area of the working field. Likewise, charged pipette tips can repel each other if they are stored in a storage box, for example. This can result in them no longer being aligned sufficiently axially and can lead to tilting or even deformation when placed on a pipetting head.

A pipette tip carrier for plastic pipette tips is known from document EP 1 414 574 B2, in which at least the support plate with the receiving openings for the pipette tips and one of the side walls are always electrically conductive. Any electrostatic charges that may be present are to be dissipated onto the support plate when the pipette tips are re-inserted.

From document US 2016/0167041 A1 a storage device for pipette tips is known for combating electrostatic charges. The pipette tips can be inserted for this purpose in receptions of an electrically conductive retention plate so that electrostatic charges can be transferred to the retention plate. The retention plate can be placed on a storage box together with the inserted pipette tips.

Furthermore, a pipette tip tray is known from document EP 2 389 247 B1, which has a cover with an electrically conductive element. The electrically conductive element is in contact with the upper surfaces of inserted pipette tips and the cover. Electrical charges are thus transferred to the cover.

SUMMARY OF THE INVENTION

It is an object of the present invention to provide a storage box for pipette tips that is simple in design and with which electrostatically charged plastic pipette tips can be easily and effectively discharged.

The object is solved by a storage box for plastic pipette tips according to independent claim 1.

By providing an at least partially electrically conductive pipette tip contact piece and optionally an at least partially electrically conductive base plate, which is arranged on the underside of the storage box, electrostatic charges which may arise during normal use of the storage box in laboratory operation can be dissipated onto the pipette tip contact piece and where applicable onto the optional base plate.

In this case, the pipette tip contact piece establishes a direct contact between inserted pipette tips, and potential electrostatic charges can pass to the pipette tip contact piece.

It is a further object of the invention to provide a method with which electrostatically charged plastic pipette tips can be easily discharged, if possible before they are used.

This object is solved by providing a method according to the independent claim 19, in which, among other things, a storage box according to the invention is provided.

Advantageous embodiments of the invention are indicated in the dependent claims.

BRIEF DESCRIPTION OF THE DRAWINGS

The present invention is explained in more detail using the following exemplary schematic figures (FIG.), wherein:

FIGS. 2A and 2B show strongly schematized, spatial representations of a storage box with conductive base and conductive webs, wherein FIG. 2A shows an overview of a storage box where the pipette tip contact piece and the optional base are removed from the frame, and FIG. 2B shows a longitudinal section through the storage box shown in FIG. 2A with attached pipette tip contact piece and base;

FIGS. 3A, 3B and 3C show strongly schematized top views of the upper side of a storage box, wherein various arrangements of longitudinal and transverse webs are indicated by dashes, and wherein FIG. 3A shows a storage box with transverse webs and longitudinal webs, FIG. 3B shows a storage box with longitudinal webs, and FIG. 3C shows a storage box with transverse webs;

FIGS. 4A and 4B show strongly schematized cross-sections through various examples of a storage box with conductive base, wherein FIG. 4A shows a storage box to which the base with the webs can be attached from below, and FIG. 4B shows a storage box insertable into a separate storage container, wherein the storage container comprises a conductive base and conductive webs;

FIGS. 5A and 5B show a strongly schematized cross-section through a storage box with alternative pipette tip contact pieces, wherein FIG. 5A shows a storage box with an integral conductive base and pipette tip contact pieces, wherein pipette tip contact pieces of different heights are shown;

FIG. 5B shows a storage box with pipette tip contact pieces of different heights and materials, and FIG. 6 shows a highly schematic overview of a liquid handling workstation with a work surface and a storage box and standard microplate positioned on it.

DETAILED DESCRIPTION OF THE INVENTION

Figure 1:
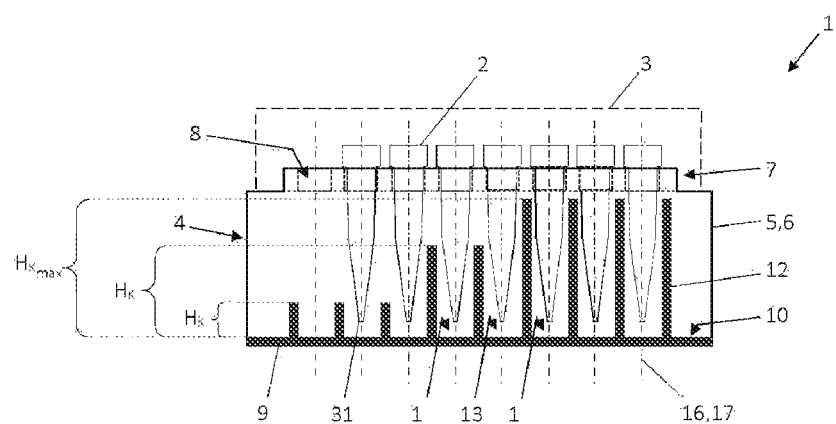
FIG. 1 shows a strongly schematized cross-section through a storage box with conductive base and conductive webs as pipette tip contact piece.

The present invention relates to a storage box 1 in which pipette tips 2 can be inserted and stored. In particular, the storage box 1 is suitable for use with plastic pipette tips 2. Such pipette tips 2 are often used for disposable use, i.e. they are discarded after one use or at least after a few uses. If plastic pipette tips 2 are stored in a storage box 1 described in the following, electrostatic charges which occur unintentionally during normal handling of the pipette tips 2 can simply be dissipated from the pipette tips 2.

The figures show various exemplary storage boxes 1. The storage box 1 for plastic pipette tips 2 contains a frame part 4, which is preferably rectangular. Frame part 4 is formed by two longitudinal walls 5 and two transverse walls 6. The two longitudinal walls 5 and the two transverse walls 6 enclose an interior space laterally and leave open a first opening at the upper side 25 of frame part 4 and a second opening at the underside 26 of the frame part 4. In particular, the longitudinal and transverse walls 11, 12 and the frame formed by them may be taken from FIGS. 2A, 2B and 3A-3C. The pipette tips 2 can protrude into the interior if they are inserted into the storage box 1.

According to the present invention, the frame part 4 is essentially electrically non-conductive. The frame part 4, i.e. the longitudinal walls 5 and the transverse walls 6, are preferably made of a plastic with a very low electrical conductivity.

A support plate 7 is arranged on the upper side 25 of frame part 4. The support plate 7 extends along the first opening of the frame part 4 and essentially perpendicular to the longitudinal walls 5 and the transverse walls 6. It thus essentially covers the first opening. The support plate 7 is preferably connected to the upper side 25 of frame part 4, i.e. to the respective upper sides of the longitudinal and transverse walls 5, 6.

According to the present invention, the support plate 7 is also essentially electrically non-conductive. The support plate 7 is also preferably made of a plastic with a very low electrical conductivity.

Examples of materials for the electrically non-conductive frame part 4 or for the electrically non-conductive support plate 7 are plastic polymers such as polypropylene or polyethylene.

The support plate 7 comprises a plurality of bearing openings 8 for plastic pipette tips 2. Each bearing opening 8 completely penetrates the support plate 7. One pipette tip 2 can be inserted into each bearing opening 8. Typically, pipette tips 2 have a holding structure at their upper end opposite the liquid outlet, which holds them in the bearing opening 8. This can be, for example, a circumferential collar, retaining webs or a circumferential plastic or rubber ring, which is larger than the diameter of the respective bearing opening 8. This prevents an inserted pipette tip 2 from slipping through a bearing opening 8.

The number of bearing openings 8 in the support plate 7 is preferably selected so that it corresponds to the number of wells of a standard microplate 27. Exemplarily mentioned are 96, 384 or 1536 wells. If the number of bearing openings 8 is matched to a standard microplate, the bearing openings 8 are preferably embedded in an array in the support plate 7, which corresponds to the wells array of the respective standard microplate 27. For 96 bearing openings 8, for example, this corresponds to an array of 8 times 12 bearing openings (see FIGS. 3A to 3C), for 384 bearing openings (see FIG. 2A) to an array of 16 times 24.

It may be provided that the longitudinal and transverse walls 5, 6 are not arranged completely at a right angle to the support plate 7 as shown in FIG. 1, but at a slightly different angle from it. In particular, the longitudinal and transverse walls 5, 6 may be arranged in relation to the support plate 7 in such a way that they form side walls spread apart in the direction of the underside 26 of frame part 4 (see FIG. 2A). This may result in improved stability of the storage box 1.

In accordance with the invention, the storage box 1 comprises on its underside 26 an at least partially electrically conductive pipette tip contact piece 14 for contacting at least one pipette tip 2 inserted into one of the bearing openings 8. The pipette tip contact piece 14 extends from the underside of the frame piece starting in the direction of the upper side 25 of the storage box 1, i.e. in the direction of the support plate 7, by a height $H_K$. This height $H_K$ is selected so that in normal use, inserted pipette tips 2 can touch the pipette tip contact piece 14. The height $H_K$ is preferably selected so that an inserted pipette tip 2 can touch the pipette tip contact piece 14 at least with its lower end, preferably with its outlet end 31. By touching, any electrostatic charges present on the pipette tip 2 are dissipated onto the electrically conductive pipette tip contact piece 14. The at least partial electrical conductivity of the pipette tip contact piece 14 is preferably achieved by comprising or being entirely made of an electrically conductive material.

The pipette tip contact piece 14 can be configured differently. For example, it may be formed by longitudinal webs 11 and/or transverse webs 12 arranged on the underside 26 of storage box 1 and extending towards the upper side 25 of storage box 1 (see, for example, FIGS. 1 to 4). Inserted pipette tips 2 can then touch the inside of the webs, which face directly towards the pipette tip 2. Alternatively, the pipette tip contact piece 14 can also be more plate-shaped, in which case it preferably has recesses on the surface facing the support plate into which inserted pipette tips 2 can project (see FIGS. 5A-5B).

In a particularly advantageous embodiment of the storage box 1, the pipette tip contact piece 14 is formed both by a plurality of longitudinal webs 11 and by a plurality of transverse webs 12 (see, for example, FIGS. 2A and 2B and FIGS. 3A to 3C). Preferably, longitudinal webs 11 extend substantially parallel to the longitudinal walls 5 of frame part 4, and transverse webs 12 preferably extend substantially parallel to the transverse walls 6 of frame part 4. Preferably, the longitudinal webs 11 and the transverse webs 12 are arranged on the underside 26 of frame part 4, and extend not only substantially perpendicular to the support plate 7 but also in the direction of support plate 7 by a height $H_K$ each. The webs 11, 12 are arranged with respect to each other and to the support plate 7 in such a way that they extend between the bearing openings 8 and leave free space under a bearing opening 8 for pipette tips 2 to be inserted. They have no or no significant effect on the position of an inserted pipette tip 2.

FIG. 1 shows an exemplary storage box 1 for plastic pipette tips 2. A storage box 1 with optional lid 3 is shown. The pipette tip contact piece 14 is formed from a large number of longitudinal webs 11 and transverse webs 12. In the cross-section the transverse webs 12 are shown by way of example, while the longitudinal webs 11 are not visible. In the upper support plate 7 eight bearing openings 8 for storing pipette tips 2 are shown. Each bearing opening 8 completely penetrates the support plate 7 so that a pipette tip 2 can be inserted. In seven of the eight bearing openings 8 shown, pipette tips 2 are inserted, which are held in the bearing opening 8 by means of a circumferential collar. For reasons of clarity, a bearing opening 8 is shown free, i.e. without pipette tip 2 inserted.

A medial axis 16 is shown for each of the bearing openings 8. A bearing opening 8, for example, is shown as a cylindrical opening in the support plate 7. The medial axis 16 here designates a straight line which runs through the center point of the respective circular bearing opening 8 and along its axis conceived as a line. An inserted pipette tip 2 typically aligns with its longitudinal axis along the medial axis 16, wherein the diameter of the circular bearing opening 8 is such that an inserted pipette tip 2 is supported with some clearance in the bearing opening 8. An inserted pipette tip 2 is thus moved slightly in the bearing opening 8 and the frame part 4 when the entire storage box 1 is moved. Alternatively, instead of a bearing opening 8 with a circular diameter, a different shape may be selected for the bearing opening 8, e.g. a polygonal shape, as long as an inserted pipette tip 2 is held with clearance in the bearing opening 8.

The electrically conductive webs 11, 12 of the storage box 1 form contact areas for inserted pipette tips 2 in a simple manner. Since pipette tips 2 are inserted in a storage box 1 so that they can be slightly moved, their lower end touches the electrically conductive webs 11, 12 arranged on the underside 26 of the frame, for example when the storage box 1 is transported or when during reinsertion into a bearing opening 8. When the webs 11, 12 are contacted, the electrostatic charge can be diverted from a pipette tip 2 to the electrically conductive webs 11, 12 or at least redistributed.

If longitudinal and transverse webs 11, 12 are used as pipette tip contact pieces 14, these are preferably arranged on the underside 26 of frame part 4 and to each other in such a way that they form an array of receptacles 13 on the underside 26 of frame part 4. It may be provided that one receptacle 13 is assigned to one inserted pipette tip 2. If the bearing openings 8 are arranged in a defined array in the support plate 7, the arrangement of the receptacles 13 on the underside 26 of the frame part can correspond to the arrangement of the bearing openings 8 in the support plate 7. Thus, into each receptacle 13 on the underside 26 of the frame part 4, the outlet end 31 of one pipette tip 2 inserted projects into the corresponding bearing opening 8. A medial axis 17 of a receptacle 13 can essentially lie on the medial axis 16 of the associated bearing opening 8. Alternative arrangements are discussed for FIGS. 3A to 3C.

FIG. 1 shows by way of example the illustrated conductive transverse webs 12 with different heights $H_K$. It may be provided that the longitudinal and/or transverse webs 11, 12 for a storage box 1 each have the same height $H_K$ (see FIGS. 4A and B). The height $H_K$ can be adapted to the length of the pipette tips 2 to be used so that a specific height $H_K$ of the longitudinal and/or transverse webs can be selected for each storage box 1. Alternatively, it may be provided that for a storage box 1 the longitudinal and/or transverse webs 11, 12 are of different heights, so that receptacles 13 of different heights are formed in the interior of the storage box 1. This variant can be preferred if pipette tips 2 of different lengths are to be stored and offered in a storage box 1. Adjusting the height $H_K$ to the length of the pipette tips 2 to be used ensures that each inserted pipette tip 2 can touch an electrically conductive pipette tip contact piece 14, i.e. in this case an electrically conductive web 11, 12.

For example, the height $H_K$ may be chosen so that the pipette tip contact piece 14 extends at least one third and/or half and/or two thirds of the height of the frame part 4 in the direction of the support plate 7.

The four transverse webs 12 shown at the right edge of storage box 1 have a maximum height $H_{Kmax}$. The maximum height $H_{Kmax}$ is selected so that the webs 11, 12 do not touch the underside of the separating plate 7. The longitudinal and/or transverse webs 11, 12 therefore have no supporting function for stabilizing the support plate 7. A pipette tip contact piece 14 in general and the longitudinal and/or transverse webs 12 in particular are preferably suitable for those conventional storage boxes 1 which have their own stabilizing struts 30 on the underside of the support plate 7 (see also FIG. 2B).

Figure 2A:
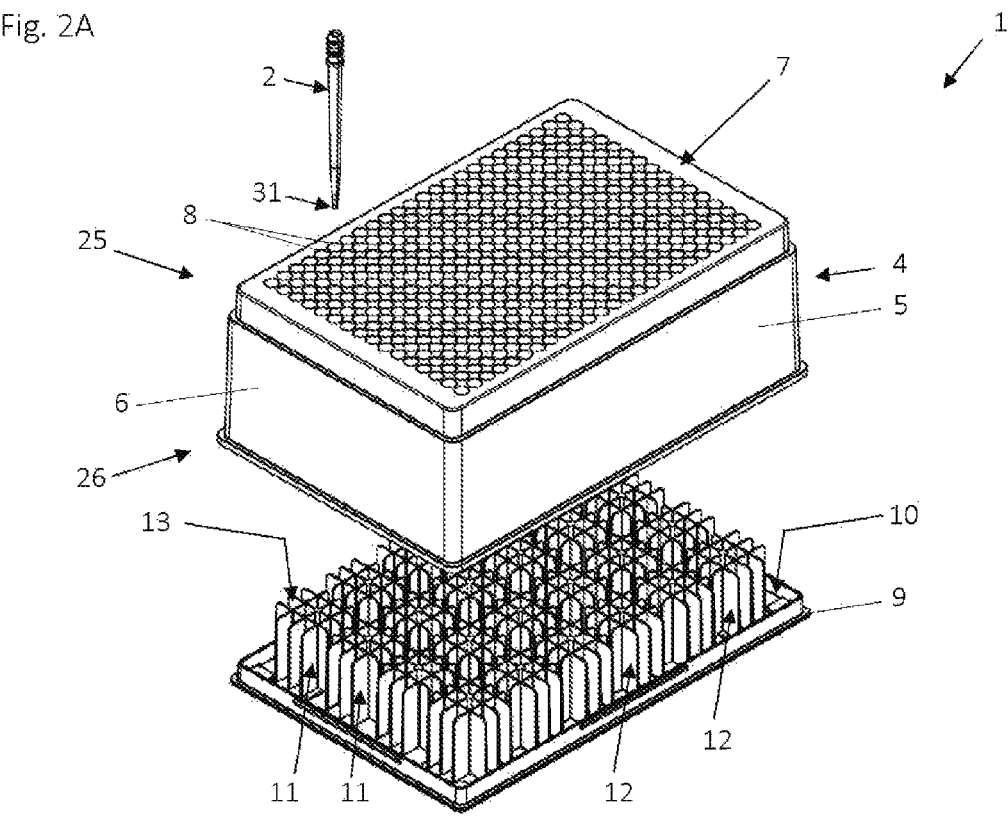

FIG. 2A shows a particularly preferred embodiment of the storage box 1, in which the pipette tip contact piece 14 is formed from a plurality of longitudinal webs 11 and a plurality of transverse webs 12. In this case, the longitudinal and transverse webs 11, 12 are arranged on an optional base plate 9. The base plate 9 is arranged at the underside 26 of the frame part 4 and forms the bottom of the storage box, while the webs 11, 12 form the corresponding receptacles 13 for pipette tips 2 inserted into the storage box 1 above the base plate 9. Such a possible lower base plate 9 extends essentially perpendicularly to the longitudinal walls 5 and the transverse walls 6 of the frame part 4 and essentially parallel to the support plate 7. Without the optional base plate 9, the underside of the pipette tip contact piece 14 forms the base of the storage box 1.

A base plate 9 can be provided in particular if the electrically conductive contact surface of the storage box 1 is to be additionally enlarged towards a working surface, for example to a metallic working surface 24 of a liquid handling platform 23. However, it can also serve as a fastening aid for the pipette tip contact piece 14 to the storage box 1 or for its stabilization.

A storage box 1 according to the invention is used particularly advantageously in connection with work on a metallic work surface 24, such as, for example, in the context of work on an automated liquid handling platform 23, which has a work table 24 with a metallic surface. In this way, electrostatic charges can be discharged from the pipette tip 2 via the storage box 1, i.e. in particular via the pipette tip contact piece 14 and, if used, the lower base plate 9 to the working plate 24. If such metallic worktops are connected to earth (grounded), electrostatic charges can essentially be completely discharged from the disposable pipette tips 9 via the storage box 1 and the worktop to the environment.

If, for example, longitudinal and/or transverse webs 11, 12 are used as pipette tip contact piece 14, the lower edges of these webs can form the bottom surface or support surface with which the storage box 1 is positioned on a work surface without using an optional base plate 9. By using in each case a plurality of electrically conductive longitudinal webs 11 and/or transverse webs 12, a relatively large area is provided on which electrostatic charges can be redistributed from the pipette tips. In addition, the sum of the lower edges of the webs 11, 12 used forms a relatively large contact surface with a work surface via which electrostatic charges picked up by pipette tips can be passed on to the worktop.

By means of an optional base plate 9, especially when using longitudinal and/or transverse webs 11, 12 as a pipette tip contact piece 14, the contact surface to a (possibly metallic) working surface 24 can be enlarged and thus an even better charge discharge can be achieved.

Figure 5A:
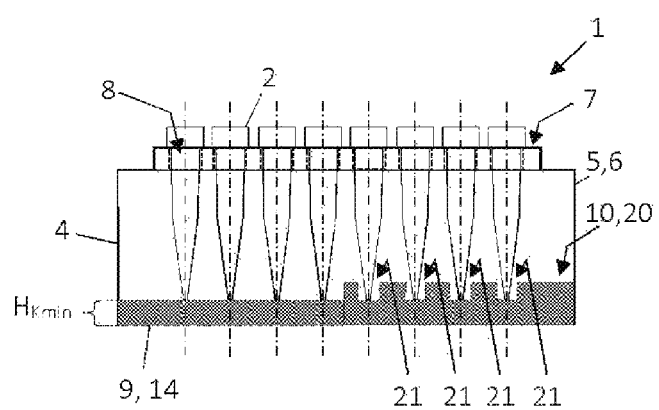
Figure 5B:
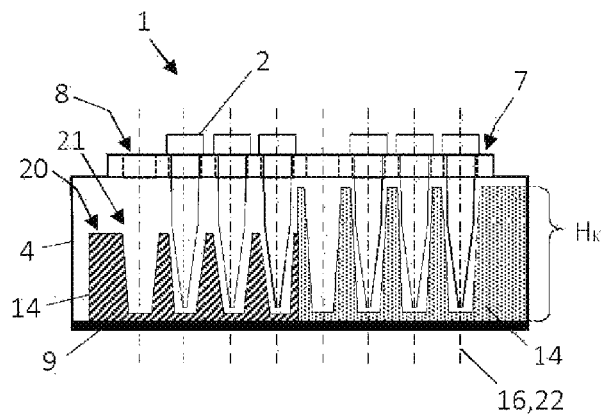

If a plate-shaped pipette tip contact piece 14 is used as an alternative, as shown in FIGS. 5A and 5B by way of example, a larger contact area to a working surface is automatically provided simply due to the shape. An additional enlargement of the contact area by a base plate 9 is not necessary for this variant. Nevertheless, a base plate 9 can also be provided here, for example, to simplify the attachment of the pipette tip contact piece 14 to the frame part 4, or to increase the stability.

FIG. 2A shows a spatial representation of a storage box 1 in which the pipette tip contact piece 14 and the base plate 9 are integral and are configured as a common, separate base part that can be attached to the storage box 1. The pipette tip contact piece 14 is formed by a plurality of longitudinal webs 11 and transverse webs 12 which are arranged on the upper side 10 of the base plate 9 in such a way that they form a plurality of receptacles 13 into each of which an inserted pipette tip 2 projects at least with its lower outlet end 31. The frame part 4 with the longitudinal and transverse walls 5, 6 is formed integrally with the upper support plate 7 and shown lifted from the pipette tip contact piece 14 and the base plate 9. A pipette tip 2 suitable for the storage box 1 is shown above one of the bearing openings 8. The base plate 9 with the longitudinal and transverse webs 11, 12 can be attached to the underside 26 of the frame section. For reasons of clarity, the medial axes 16 and 17 of bearing openings 8 and receptacles 13 are not shown here.

Figure 2B:
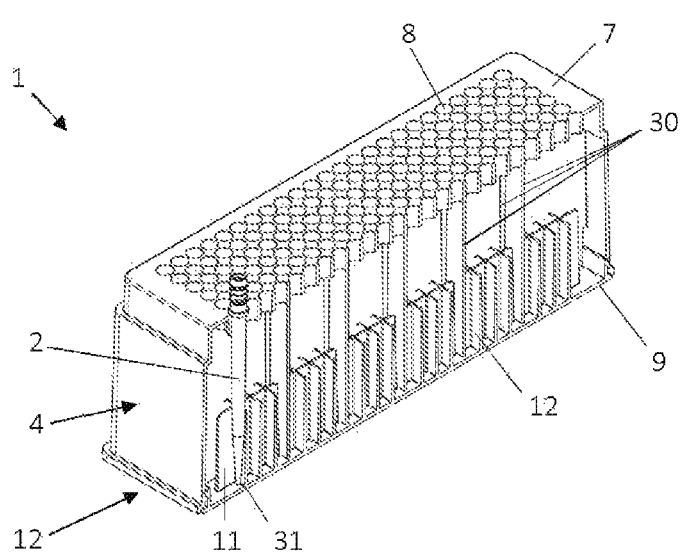
Figure 3A:
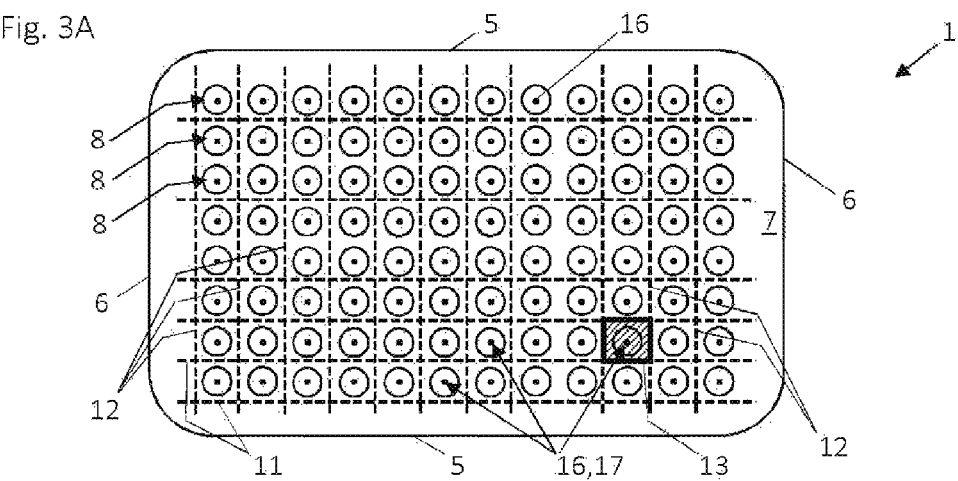
Figure 3B:
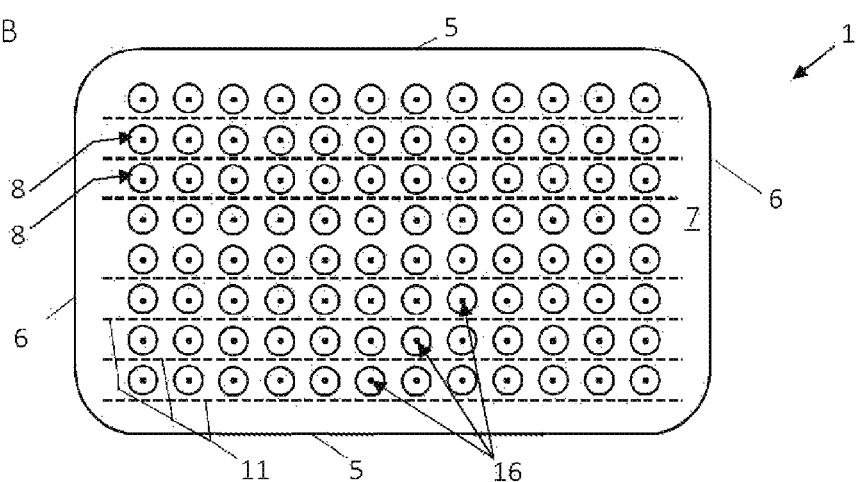
Figure 3C:
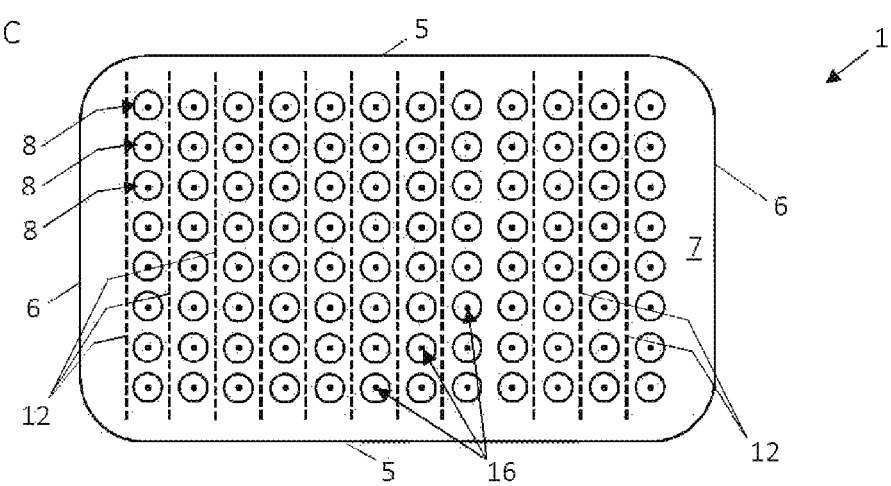

In the embodiment of the storage box 1 shown in FIG. 2A, each of the longitudinal webs 11 and each of the transverse webs 12 has an equal height $H_K$, so that each of the receptacles 13 formed by the longitudinal webs 11 and the transverse webs 12 also has the same height H. The exemplary storage box 1 shown in FIGS. 2A and 2B is designed to store 384 pipette tips 2; accordingly, it has 384 bearing openings 8 for plastic pipette tips 2. The number of longitudinal webs 11 and transverse webs 12 arranged on the base plate 9 is selected so that each inserted pipette tip 2 projects into a receptacle 13 and, at that location, can contact at least one of the longitudinal webs 11 and one of the transverse webs 12. Also possible numbers and arrangements of webs are shown in FIGS. 3A to 3C.

The storage box 1 shown in FIG. 2A is designed for 384 125 µL pipette tips 2. These pipette tips 2 have a length of approx. 54.8 mm. The storage box 1 itself is 48 mm high, 127.76 mm long and 85.50 mm wide. The base plate with twelve longitudinal webs 11 and eighteen transverse webs 12 has a height of 21 mm, a length of 125.65 mm and a width of 83.40 mm. The number and arrangement of the longitudinal and transverse webs 11, 12 is selected so that web-free "aisles" are formed between the webs. Stabilizing struts 30 extending from the underside of the support plate 7 towards the underside 26 of the frame part 4 can project into these aisles.

FIG. 2B shows such stabilizing struts 30 of the storage box 1. Such stabilizing struts 30 can be attached, for example, at regular intervals to the underside of the support plate 7 and extend through the interior of the frame part 4 to the base plate 9. They serve to stabilize the storage box 1, in particular the upper support plate 7, if, for example, pipette tips 2 are picked up from the box by a pipetting head 28. Without such stabilization struts 30, there is a risk that the support plate 7 would be pressed in or otherwise deformed due to the pipetting head 28 pressing on top of the pipette tips 2. The use of a pipette tip contact piece 14 according to the invention with a storage box 1, which already includes such stabilizing struts on its own, is particularly preferred, as it is not intended that the pipette tip contact piece 14 assumes a stabilizing function on the support plate 7. Accordingly, it is not intended that the pipette tip contact piece 14 extends from the underside of the frame part 4 to the underside 26 of the support plate 7 and abuts there.

The electrical conductivity of the pipette tip contact piece 14 can be achieved, for example, by coating a suitably shaped workpiece made of an essentially non-conductive plastic with an electrically conductive material. This can be particularly useful if, for example, webs 11, 12 are provided as pipette tip contact pieces. Alternatively or additionally, the pipette tip contact piece 14 can be made of an electrically conductive material.

Suitable materials for an electrically conductive coating of a pipette tip contact piece 14 are, for example, graphite sprays (e.g. the graphite 33 lacquer of the company CRC Industries Deutschland GmbH) or metallic coatings through metallic foils, e.g. made of aluminum. Alternatively or in addition, the plastic polymer could also be mixed with conductive materials such as graphite. Suitable, electrically conductive materials for the manufacture of pipette tip contact pieces 14 are, for example, graphite-containing polypropylene or (hard) rubber containing graphite. Metallic materials are also suitable for the manufacture of an electrically conductive pipette tip contact piece 14, such as iron, aluminum or copper compounds.

If, for example, electrically conductive, plate-shaped structures are used instead of webs 11, 12 as pipette tip contact pieces 14, as shown in FIGS. 5A and 5B, a foamed, graphite-containing plastic polymer can also be used.

The electrical conductivity of the optional base plate 9 can also be achieved, for example, by coating a corresponding plastic plate with an electrically conductive material. Alternatively, the base plate 9 can be partially or preferably completely made of an electrically conductive material.

Suitable materials for the electrically conductive coating of a base plate 9 are, for example, graphite sprays or metallic coatings such as metallic foils. Suitable materials for the production of electrically conductive base plates 9 are also graphite-containing polymers, foamed or unfoamed, graphite-containing hard rubber, or metallic materials such as aluminum, iron or copper compounds.

In FIGS. 3A to 3C, storage boxes 1 are shown in a top view of the upper support plate 7. The outer sides of the longitudinal and transverse walls 5, 6 of the frame part 4 and the bearing openings 8 in the upper support plate 7 are particularly visible. The longitudinal webs 11 and/or the transverse webs 12 are shown dashed to show that they are arranged below the support plate 7.

In FIG. 3A, the pipette tip contact piece is formed by a large number of longitudinal webs 11 and transverse webs 12. The longitudinal webs 11 extend essentially parallel to the longitudinal walls 5 of frame part 4 and are arranged at defined distances to each other and to the longitudinal walls 5. The transverse webs 12 extend essentially parallel to the transverse walls 6 of the frame part and are arranged at defined distances to each other and to the transverse walls 6. Longitudinal webs 11 and transverse webs 12 are arranged in the interior of frame part 4 in such a way that they form receptacles 13 for one or more pipette tips 2. In accordance with the invention, the webs 11, 12 are arranged on the underside 26 of the frame part 4 and extend in its interior by a height $H_K$ in the direction of the underside of the support plate 7, so that an inserted pipette tip 2 can at least with its outlet end 31 touch one of the webs 11, 12 when, for example, the storage box 1 is moved. Due to the top view, the height $H_K$ of the webs 11, 12 is not visible.

At least some of the longitudinal webs 11 and the transverse webs 12 are formed in an electrically conductive manner. Preferably, each longitudinal web 11 and each transverse web 12 in this embodiment is electrically conductive, so that each pipette tip 2 inserted in a bearing opening 8 can contact an electrically conductive longitudinal web 11 or an electrically conductive transverse web 12.

It may be provided that the longitudinal webs 11 and the transverse webs 12 are arranged in such a way that they form an array of receptacles 13 which corresponds to the array of the bearing openings 8 in the support plate 7. Each bearing opening 8 of the support plate 7 is thus assigned a receptacle 13 on the underside of the frame part 4. Such a receptacle 13, which is assigned to a bearing opening 8, is emphasized in FIG. 3A by a bold bordered, shaded square for the sake of illustration. The webs 11, 12 therefore preferably extend between the bearing openings 8 and leave the space below each bearing opening 8 free for a pipette tip 2 to be inserted.

The medial axes 16 of the individual bearing openings 8 are also shown. For selected examples, the medial axes 17 of a receptacle 13 assigned to a bearing opening 8 are also shown. In these cases, the medial axis 16 of a bearing opening 8 and the medial axis 17 of a receptacle 13 assigned to this bearing opening 8 lie on a common straight line.

It may be provided that the longitudinal webs 11 and the transverse webs 12 each form a kind of outer boundary of the receptacles 13. This is shown for the left transverse side 6 and for the lower longitudinal side 5 of the storage box 1 in the top view from FIG. 3A. Alternatively, the receptacles 13 can remain "open" in the direction of the inner sides of the frame part 4 (see the outer receptacles 13 shown in the direction of the upper longitudinal side 5 and the right transverse side 6).

It may also be provided that the number of longitudinal webs 11 and the transverse webs 12 and their arrangement in the interior of the frame part 4 are selected such that not only is a free space (for the ends of inserted pipette tips 2) left below each bearing opening 8 in the support plate but also that free space is formed between bearing openings 8 for stabilizing struts 30 which project from the support plate 7 into the interior of the storage box 1. This has already been mentioned in connection with FIG. 2B. FIG. 3A shows as an example how the regular arrangement of transverse webs 12 between the fourth and fifth bearing openings 8 from the right and between the fourth and fifth bearing openings from the top is interrupted, since no transverse or longitudinal web 12, 11 is arranged at these positions and thus an aisle is formed into which stabilizing struts 30 of the storage box 1 can project.

FIG. 3B shows an exemplary storage box 1 in which the pipette tip contact piece 14 is formed by a large number of longitudinal webs 11 but without transverse webs 12. In this variant, each longitudinal web 11 is preferably electrically conductive. Each longitudinal web 11 extends substantially parallel to the longitudinal walls 5 in the interior space of the frame part 4 and perpendicular to the support plate 7 by the height $H_K$ in the direction of the support plate 7. The number of longitudinal webs is preferably selected such that each pipette tip 2 inserted into a bearing opening 8 can contact at least one of the longitudinal webs 11, wherein the longitudinal webs 11 are arranged between the bearing openings 8 and leave the space below the bearing openings 8 free along the medial axis 16 for pipette tips 2. The number and arrangement of the longitudinal webs 11, as described in FIG. 3A, can also be adapted, for example, to the presence of stabilizing struts 30, which also extend into the interior of frame part 4.

FIG. 3B shows various possible arrangements of longitudinal webs 11 as examples. For example, only one longitudinal web 11 is provided for the bearing openings 8 of the first, upper longitudinal row and only one longitudinal web 11 is provided for the bearing openings 8 of the fourth and fifth rows from above. The bearing openings 8 of rows 2, 3 and 6 to 8 (as seen from above in the figure) are "flanked" in each case by two longitudinal webs 11. The aisle between the bearing openings between the fourth and fifth rows from above can be used to accommodate a corresponding stabilizing strut 30.

FIG. 3C shows an exemplary storage box 1 in which the pipette tip contact piece 14 is formed by a large number of transverse webs 12 but without longitudinal webs 11, which are electrically conductive. The number of transverse webs 12, which are electrically conductive, and their arrangement in the interior of the frame part 4 is also here preferably selected in such a way that each pipette tip 2 inserted into one of the bearing openings 8 can contact an electrically conductive (transverse) web, for example if the storage box 1 is moved. In this case, the transverse webs 12 extend essentially parallel to the transverse walls 5 of frame part 4. In addition, the transverse webs 12 extend perpendicularly to the support plate 7 by the height $H_K$ in the direction of the support plate 7.

The transverse webs 12 are arranged between the bearing openings 8 and leave the space below the bearing openings 8 free along the medial axis 16 for pipette tips 2. The same statements made in connection with FIGS. 3A and 3B also apply to the selection of the number of transverse webs 12 used and their arrangement in the interior of frame part 4. For example, the aisle between bearing openings 8 of rows four and five (seen from the right) enables any stabilizing strut 30 that may be present to be accommodated in this aisle.

Preferably, the longitudinal webs 11 in the embodiment as shown in FIG. 3B or the transverse webs 12 in an embodiment as shown in FIG. 3C each have the same height $H_K$. Alternatively, the height $H_K$ of the longitudinal webs 11 or the transverse webs 12 may be different and adapted to the length of the pipette tips 2 to be used.

It is preferable that the pipette tip contact piece is configured in such a way that in the normal handling sequence of a storage box 1 it is possible to contact each pipette tip 2 used with the pipette tip contact piece 14 in order to enable any electrostatic charges that may have been generated to be dissipated from the pipette tip 2 to the pipette tip contact piece. The number and arrangement of longitudinal webs 11 and/or transverse webs 12 are particularly preferred so that two or more contact surfaces are provided by the webs for each pipette tip 2 inserted into a bearing opening 8.

Figure 4A:
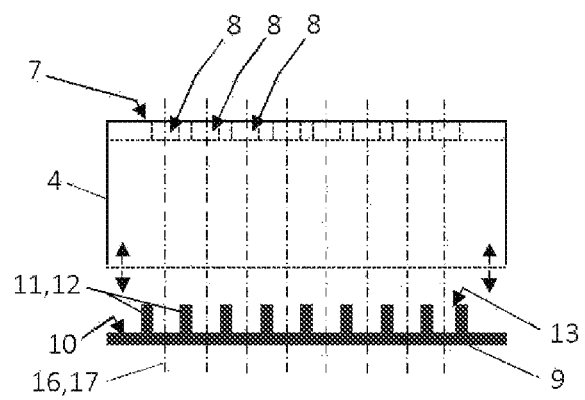
Figure 4B:
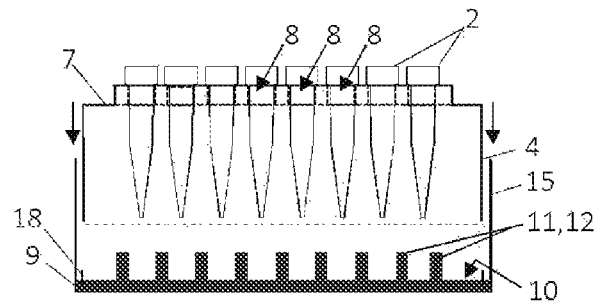

FIGS. 4A and 4B show different variants of a storage box 1 with a pipette tip contact piece 14 and a base plate 9. The pipette tip contact piece 14 is formed in each case from longitudinal webs 11 and/or transverse webs 12 but only one web type is shown in each of these figures.

FIG. 4A shows a variant of a storage box 1 in which the base plate 9 is integrally formed with the longitudinal webs 11 and/or the transverse webs 12. The base plate 9 is preferably integrally formed with all the webs which form the pipette tip contact piece. The base plate 9 with the webs 11, 12 can be connected to the underside of the frame part 4. The connection can be made, for example, by clamping, by gluing or by a plug connection (not shown). The direction in which the frame part 4 and the base plate 9 are moved towards each other for connection is marked by two arrows.

FIG. 4B shows a variant of a storage box 1 in which the base plate 9 and the longitudinal webs 11 and/or transverse webs 12 are also integrally formed. In this variant, the base plate 9 and the webs 11, 12 do not directly form the base of storage box 1 but are part of a container 15 separate from frame part 4. The dimensions of container 15 are adapted to the frame part 4 so that the frame part 4 can be inserted into the container 15. The container 15 thus serves to accommodate the frame part 4 with the support plate 7. The insertion direction is marked by two arrows. For a better hold of the frame part 4 in the container 15, it may be provided that the frame part 4 is fastened in the container 15, for example, by means of a clamp connection or a plug connection. FIG. 4B shows by way of example holding pins 18 on the base plate 9 with which a plug connection can be made to the frame part 4. Alternatively, frame part 4 could also be clamped with its outer sides between these holding pins 18.

As an alternative to an integral combination of webs 11, 12 and base plate 9, the webs 11, 12 can be configured separately from a base plate 9 to be attachable to the frame part 4. The optional base plate 9 can then be attached to the storage box 1 if required.

The advantage of the variants of the storage boxes according to FIGS. 4A and 4B is that conventional storage boxes 1, which are commercially available, can be used. The pipette tip contact piece 14 and the optional base plate 9 can then be specifically adapted to the corresponding storage box 1 and the pipette tips 2 to be used.

Since storage boxes 1 are typically distributed together with the respective pipette tips 2 (e.g. robotic tips blackKnights, 200 µL, article no. 49002-0007 and tip box for 50 µL and 200 µL, article no. 45009-3000; both Ritter Medical, Ritter GmbH, 86830 Schwabmünchen, Germany), a pipette tip contact piece 14 according to the invention can be adapted to the desired storage box 1 by, for example, replacing conventional, non-conductive base parts with a conductive pipette tip contact piece.

The electrically conductive pipette tip contact piece 14 for dissipating electrostatic charges eventually present on plastic pipette tips 2 is thus preferably a separate structure to the frame part 4 and support plate 7 of the storage box 1, which is connected to the storage box 1 in addition.

FIGS. 5A and 5B each show a storage box 1 with alternatively designed pipette tip contact pieces 14. In these variants, the pipette tip contact piece 14 is formed by an electrically conductive contact plate which is arranged on the underside 26 of frame part 4.

FIG. 5A shows a storage box 1 which does not include the optional base plate 9. In this storage box 1 it is provided that the plate-shaped pipette tip contact piece 14 itself forms the bottom of the storage box 1 on the underside 26 of the frame part 4. In this case, the electrically conductive contact plate preferably consists of a dimensionally stable material, so that even without a base plate 9, there is sufficient stability for the pipette tip contact piece 14 to form a base of the storage box 1. The plate shape also provides a satisfactorily large contact surface for dissipating electrostatic charges from inserted plastic pipette tips to a work surface 24.

If it is preferred to also provide a base plate 9 for a contact plate, these can preferably be connected to the base plate 9 by means of a plug connection or an adhesive connection. Alternatively, the pipette tip contact piece 14 can be integrally designed with a base plate 9 and can thus be attached to the frame part 4.

Suitable materials for electrically conductive contact plates are, for example, foams, preferably semi-rigid or hard foams, or electrically conductive rubber, such as conductive elastomers such as silicones (SRE-WxH-C from Micro Tech Components GmbH, Germany).

In FIG. 5A, the pipette tip contact piece 14 is shown to be configured differently on the left side than on the right side, but is generally made of the same material. The pipette tip contact piece 14 on the left side, which is designed as an electrically conductive contact plate, has a minimum height $H_{Kmin}$, which is necessary to ensure that a pipette tip 2 used in normal use of the storage box 1 actually touches the pipette tip contact piece 14 sufficiently to dissipate potentially existing electrostatic charges and, if possible, without impairing the fit of a pipette tip 2 used. This minimum height $H_{Kmin}$ not only depends on the length of the pipette tip 2 to be stored but also on the type of material of the contact plate.

A pipette tip contact piece 14 configured as a contact plate particularly preferably comprises an arrangement of recesses 21 on its upper side 20, i.e. on its side facing the support plate 7, which arrangement corresponds to the arrangement of the bearing openings 8 in the support plate 7. I is particularly preferred that one recess 21 on the upper side 10 of the contact plate is assigned to each bearing opening 8 in the support plate 7.

As a result, a pipette tip 2 inserted into a bearing opening 8 assigned to the recess 21 can project into each recess 21.

Such a storage box 1 with pipette tip contact pieces 14 configured as contact plates and with recesses 21 arranged in the upper side 20 of the contact plate is also shown in FIG. 5B. Here the contact plate is arranged on a base plate 9. The base plate 9 thus also serves to fasten the contact plate to the frame part 4. In addition, such a base plate 9 can also increase the stability if, for example, the contact plate consists of a less dimensionally stable, electrically conductive material, such as a correspondingly soft foam. FIG. 5B shows a storage box 1 where the contact plate on the left side is made of a different material than the contact plate on the right side. This is indicated by the different hatchings of the contact plates or the pipette tip contact pieces 14, respectively.

In addition, FIG. 5B shows pipette tip contact pieces of 14 different heights $H_K$ on the left and right side of the storage box 1. Accordingly, the recesses 21 on the upper side 20 of the contact plates also have different depths. FIG. 5B also shows that in this case the shape of the recesses 21 in the contact plate is also slightly more adapted to the shape of the pipette tips 2 to be inserted. It is particularly preferred that a medial axis 22 of a recess 21 on the upper side of the contact plate extends along the medial axis 16 of the bearing opening 8 assigned to this recess 21. The space below each bearing opening 8 is thus kept free for a pipette tip 2 to be inserted.

FIG. 6 shows a highly schematized overview of an exemplary liquid handling platform 23 with a work surface 24 and a storage box 1 and microplate 27 positioned on it. The work surface 24 can be grounded to discharge electrostatic charges from the storage box 1 to the environment via the work surface 24. The liquid handling platform 23 comprises, as an example, a robot gripper 29 with which objects can be repositioned in the liquid handling platform 23, for example in the context of a use and/or a process with the storage box 1 according to the invention. The robot gripper 29 is preferably configured to be movable (indicated by corresponding arrows), in particular along an X-axis and/or a Y-axis and/or a Z-axis of a Cartesian coordinate system (see dashed arrow diagram).

Also shown is a pipetting head 28 of the liquid handling platform 23, for which four pipettes are shown exemplarily in this case. A pipetting head 28 can be configured as a single-channel pipetting head or as a multichannel pipetting head, i.e. it can comprise one or a plurality of pipettes. For example, eight, twelve or ninety-six pipettes are also possible. The pipetting head 28 is preferably movable, as indicated by the corresponding arrows. The pipetting head 28 with the pipettes can be moved at least along the X-axis and/or Y-axis of a Cartesian coordinate system. Alternatively or additionally, the pipettes may be height-adjustable, wherein it may be provided that the pipettes themselves may be movable along the Z-axis of a Cartesian coordinate system, and/or the height-adjustability may be achieved by a corresponding movement of the pipetting head 28.

In a method for dissipating electrostatic charges from plastic pipette tips 2, a previously described storage box 1 is provided in accordance with the invention.

The storage box 1 can include a combination of the individual features described above, which is selected by a person skilled in the art in such a way as to provide a storage box 1 which is particularly advantageously configured for the pipette tips 2 to be used and the for steps to be carried out in a desired working process.

The pipette tips 2 to be used are inserted into the storage box 1 and the storage box 1 is moved during the working process. Due to the movement of the storage box 1, the pipette tips 2 inserted in the storage box 1 also move and thereby touch the pipette tip contact piece 14 in the storage box 1. During this touching, any electrostatic charges that are eventually present can then be transferred to the electrically conductive pipette tip contact piece 14. As soon as the storage box 1 is placed, for example, on a metallic surface 24 of a liquid handling platform or other conductive work surface, the charge is transferred from the pipette tip contact piece 14 to this surface. If the storage box 1 contains an electrically conductive base plate 9, the charge passes from the pipette tip contact piece 14 first to the base plate 9 and then from the base plate 9 to the corresponding working surface 24. In addition, it may be provided to connect the working surface 24 to an earth connection so that the electrostatic charges can be completely dissipated.

Movements of the storage box 1, which are carried out in the course of a working process and which can already lead to the discharge of electrostatic charges from the pipette tips 2 used, are, for example, the repositioning of the storage box 1 in a liquid handling platform 23. The repositioning can, for example, be carried out manually by a user or by means of a robot gripper 29 (see also FIG. 6).

A further movement which can lead to the discharge of electrostatic charges from pipette tips 2 is, for example, the insertion of pipette tips 2 already picked up by a pipette of a pipetting head 28 into a free bearing opening 8 in storage box 1. Electrostatic charges, which arise, for example, when a pipette tip 2 is placed on a pipette, can be dissipated by reinsertion into storage box 1 or into another storage box 1 in accordance with the invention.

For the reinsertion of a pipette tip 2 into the storage box 1, an ejector mechanism 31 of the liquid handling platform 23 is preferably used, with which pipette tips 2 can be automatically ejected from the pipette(s).

To dissipate electrostatic charges from a pipette tip 2, which was previously placed on a pipette of the liquid handling platform 23, it may be preferred that the pipette tip 2 is first inserted by this pipette into a bearing opening 8 up to at least half its length and then pushed away from the respective pipette, for example by means of an ejector mechanism 31. In this way, the respective pipette tip 2 falls freely into the storage box 1 for its remaining length and can thus, by its own movement, automatically contact the pipette tip contact piece 14 without falling out of the storage box 1 again.

In connection with the present invention, the dissipation of electrostatic charges shall include both the redistribution of electrostatic charges from plastic pipette tips 2 to the electrically conductive pipette tip contact piece 14 of the storage box 1 and, if an electrically conductive base plate 9 is present, also to said base plate 9. Likewise, electrostatic charges can not only be redistributed to electrically conductive parts of storage box 1 but can also be removed from storage box 1 by means of an earth connection.

The corresponding use of a storage box 1 in accordance with the invention, for example within the scope of working processes on automated liquid handling platforms, can avoid or even completely prevent unintentional interruptions in the working process caused by unwanted electrostatic charges of disposable pipette tips 2.

Method steps which can be performed with the liquid handling platform 23 are preferably selected from a group comprising aspirating a liquid and dispensing a liquid. Aspiration is the suction of a liquid into the pipette tip 2 and dispensing is the discharge of a liquid from the pipette tip 2. The liquid can be a single liquid, a mixture of different liquids, or a liquid/gas mixture. The liquid may also contain particles.

LIST OF REFERENCE NUMERALS

1 Storage box for pipette tips
2 Pipette tip
3 Lid
4 Frame part
5 Longitudinal wall of the frame part
6 Transverse wall of the frame part
7 Support plate
8 Bearing opening
9 Base plate
10 Upper side of the base plate
11 Longitudinal web
12 Transverse web
13 Receptacle
14 Pipette tip contact piece
15 Container
16 Medial axis of the bearing opening 8
17 Medial axis of the receptacle 13
18 Holding pin
19 Underside of the base plate
20 Upper side of pipette tip contact piece
21 Recess at 20
22 Medial axis of 21
23 Liquid handling platform
24 Work surface of the liquid handling platform
25 Upper side of the frame part
26 Underside of the frame part
27 Microplate
28 Pipetting head
29 Robot gripper
30 Stabilizing struts
31 Ejector mechanism
$H_K$ Height of pipette tip contact piece
$H_{Kmin}$ Minimum height of pipette tip contact piece
$H_{Kmax}$ Maximum height of pipette tip contact piece

The invention claimed is:

1. A storage box for storing plastic pipette tips comprising:
   an electrically non-conductive frame part which is formed from two longitudinal walls and two transverse walls, wherein the longitudinal walls and the transverse walls laterally enclose an interior space and leave open a first opening on an upper side of the frame part and a second opening on an underside of the frame part,
   an electrically non-conductive support plate for plastic pipette tips, which is connected to the upper side of the frame part and covers the first opening,
   wherein the support plate comprises a plurality of bearing openings for inserting plastic pipette tips; and
   a plurality of stabilizing struts, which extend perpendicularly from an underside of the support plate towards the underside of the frame part,
   wherein the storage box comprises an electrically conductive pipette tip contact piece attached to the underside of the frame part, enclosing the second opening; the pipette tip contact piece extends parallel to the support plate and, is configured for contacting at least one plastic pipette tip inserted into one of the plurality of bearing openings, the pipette tip contact piece extends by a height, $H_k$, from the underside of the frame part towards the upper support plate without abutting the underside of the support plate; and the plurality of stabilizing struts extend to the pipette tip contact piece.

2. The storage box according to claim 1, wherein the pipette tip contact piece is formed by a plurality of longitudinal webs and/or a plurality of transverse webs said plurality of longitudinal webs and/or said plurality of transverse webs are electrically conductive,
   wherein each of the plurality of longitudinal webs extends parallel to the longitudinal walls of the frame part and by a height $H_K$ starting from the underside towards and vertically to the support plate, and wherein each transverse web extends parallel to the transverse walls of the frame part and by the height $H_K$ starting from the underside towards the support plate, so that a pipette tip inserted into a bearing opening can be contacted by one of the longitudinal webs or by one of the transverse webs.

3. The storage box according to claim 2, wherein the pipette tip contact piece is formed by a plurality of longitudinal webs and the plurality of transverse webs.

4. The storage box according to claim 3, wherein each of the plurality of longitudinal webs and each of the plurality of transverse webs is electrically conductive.

5. The storage box according to claim 3, wherein the plurality of longitudinal webs and the plurality of transverse webs are arranged in the interior space of the frame part in such a way that the plurality of longitudinal webs and the plurality of transverse webs form on the underside of the frame part an array of receptacles for plastic pipette tips inserted into the support plate.

6. The storage box according to claim 5, wherein the plurality of longitudinal webs and the plurality of transverse webs are arranged in the interior space of the frame part in such a way that one or a plurality of the bearing openings in the support plate are located above each receptacle of the array of receptacles.

7. The storage box according to claim 1, wherein the storage box further comprising:
   a lower base plate which is arranged on the underside of the frame part and parallel to the support plate, wherein the base plate comprises an upper side facing the support plate and an underside opposite the upper side of the base plate,
   wherein the base plate is electrically conductive for receiving and/or dissipating electrostatic charges and
   wherein the pipette tip contact piece is arranged on the upper side of the base plate.

8. The storage box according to claim 7, wherein the base plate is integrally formed with the plurality of longitudinal webs and/or the plurality of transverse webs and is connectable to the underside of the frame part.

9. The storage box according to claim 7, comprising a container which is separate from the frame part, the container being integrally formed with the base plate and the plurality of longitudinal webs and/or the plurality of transverse webs
wherein the frame part is inserted into the container.

10. The storage box according to claim 2, wherein the plurality of longitudinal webs and/or the plurality of transverse webs are coated with an electrically conductive material or are produced from an electrically conductive material.

11. The storage box according to claim 1, wherein the pipette tip contact piece is an electrically conductive contact plate which is arranged on the underside of the frame part.

12. The storage box according to claim 11, wherein the electrically conductive contact plate is a plate of electrically conductive foam material.

13. The storage box according to claim 11, wherein the pipette tip contact piece comprises an upper side (20) facing the support plate and further comprises on said upper side (20), an array of recesses (21) for receiving one or more pipette tips.

14. The storage box according to claim 13, wherein below each of the plurality of bearing opening of the support plate, the pipette tip contact piece comprises a recess.

15. The storage box according to claim 11, further comprising:
a lower base plate which is arranged on the underside of the frame part and parallel to the support plate, wherein the base plate comprises an upper side facing the support plate and an underside (19) opposite said upper side of the base plate,
wherein the base plate is electrically conductive for receiving and dissipating electrostatic charges and
wherein the electrically conductive contact plate is arranged on the upper side of the base plate.

16. The storage box according to claim 7, wherein the base plate is configured being electrically conductive by an electrically conductive coating of the base plate or the base plate is made of an electrically conductive material.

17. The storage box according to claim 11, wherein the electrically conductive contact plate is a plate of a semi-rigid, electrically conductive foam material, or is a plate made of an electrically conductive rubber.

18. The storage box according to claim 15, wherein the base plate is configured being electrically conductive by an electrically conductive coating, or the base plate is made of an electrically conductive material.

19. A method of dissipating electrostatic charges from a pipette tip made of plastic, comprising:
providing a at least one storage box according to claim 1,
inserting at least one pipette tip made of plastic into the storage box, and
moving the storage box with the inserted pipette tip,
wherein the inserted at least one pipette tip is moved by moving the storage box and thus contacts the pipette tip contact piece with an outlet end, thereby dissipating eventually present electrostatic charges from the at least one pipette tip to the electrically conductive pipette tip contact piece.

20. The method according to claim 19, wherein a robot gripper (29) of a liquid handling platform is used for moving the storage box.

21. The method according to claim 20, wherein the moved storage box is placed on an electrically conductive working surface of the liquid handling platform said electrically conductive working surface being grounded by an earth connection.

22. A method of dissipating electrostatic charges from a pipette tip made of plastic, comprising:
providing a first storage box according to claim 1,
inserting at least one pipette tip made of plastic into the storage box, and
inserting the at least one pipette tip from the pipette into a free bearing opening of the plurality of bearing openings of the first storage box according to claim 1 or of the second storage box according to claim 1.

23. The method according to claim 22, wherein between placing the at least one pipette tip on a pipette and inserting the at least one pipette tip from the pipette into a free bearing opening of the plurality of bearing openings of the first storage box according to claim 1 or of the second storage box according to claim 1, at least one method step is carried out with the liquid handling platform, which is selected from a group comprising:
aspirating a liquid into the at least pipette tip, and
dispensing a liquid from the at least one pipette tip.

* * * * *